Sept. 5, 1933.  B. McCANDLESS  1,925,149
PHOTOGRAPHIC PROJECTION APPARATUS
Filed Aug. 31, 1931  2 Sheets-Sheet 1
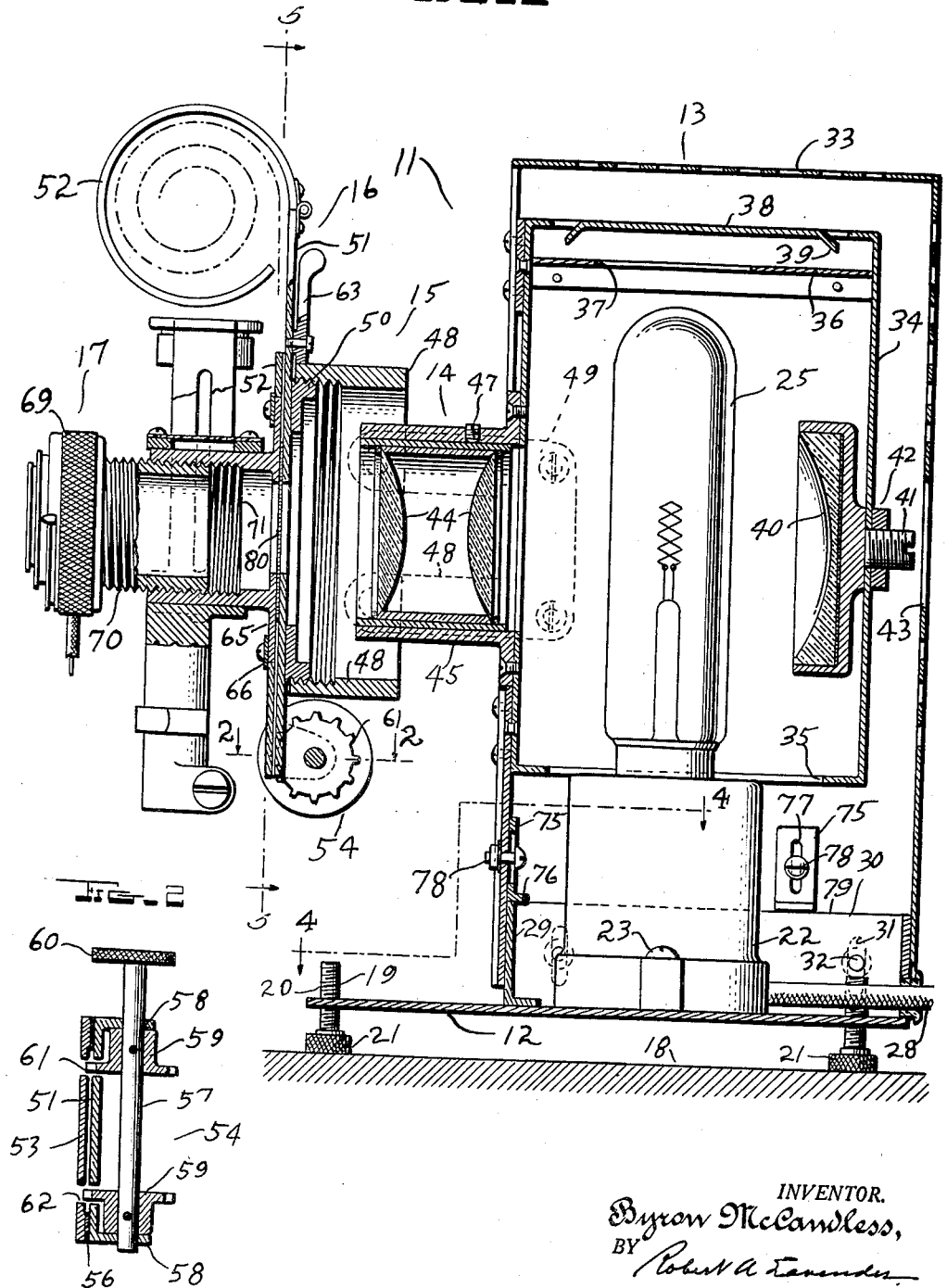
INVENTOR.
Byron McCandless,
BY
ATTORNEY.

Sept. 5, 1933.          B. McCANDLESS          1,925,149
PHOTOGRAPHIC PROJECTION APPARATUS
Filed Aug. 31, 1931          2 Sheets-Sheet 2
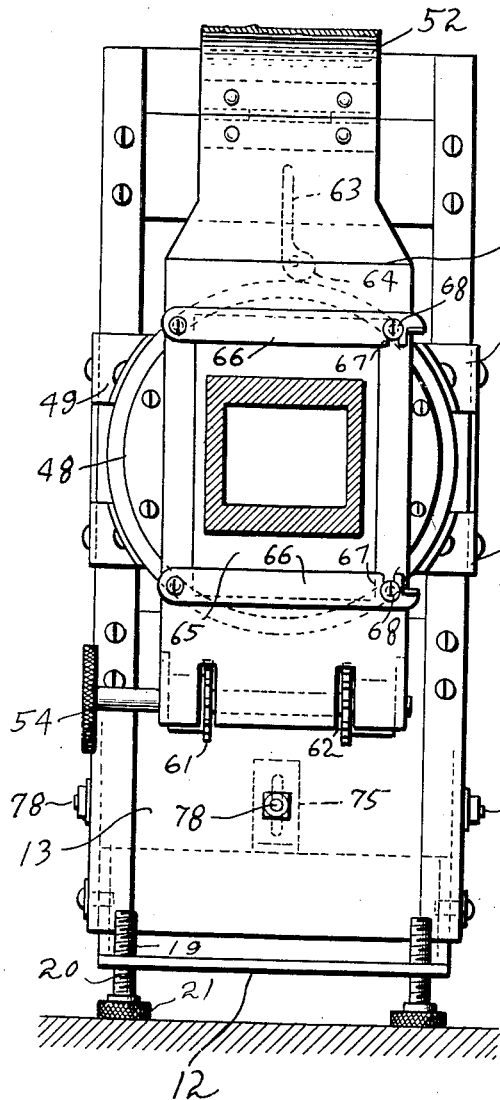
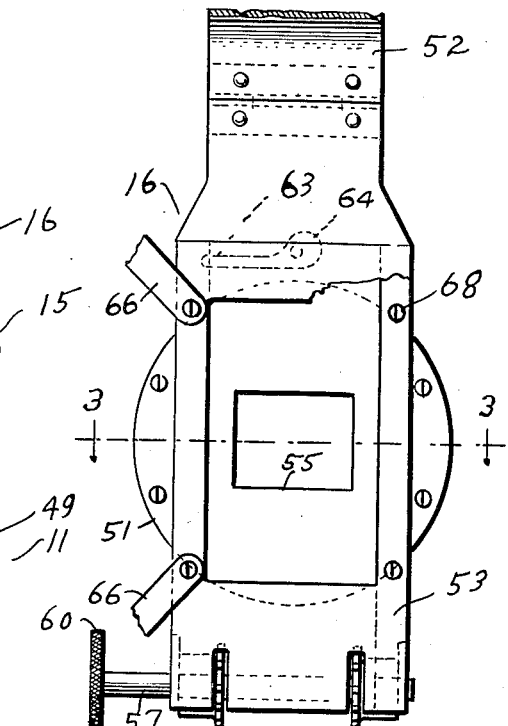
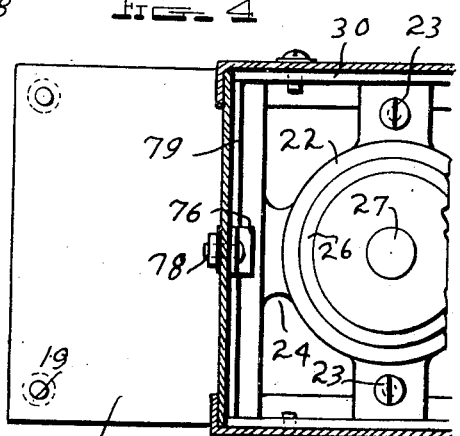
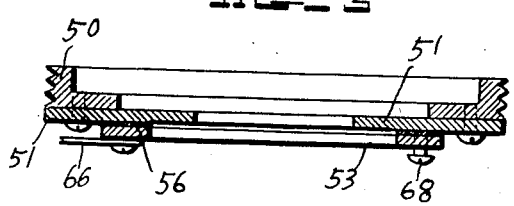
INVENTOR.
Byron McCandless,
BY Robert A. Lavender
ATTORNEY.

Patented Sept. 5, 1933

1,925,149

UNITED STATES PATENT OFFICE 1,925,149

PHOTOGRAPHIC PROJECTION APPARATUS

Byron McCandless, United States Navy

Application August 31, 1931. Serial No. 560,250

5 Claims. (Cl. 88—24)

(Granted under the Act of March 3, 1883, as amended April 30, 1928; 370 O. G. 757)

This invention relates to a photographic projection apparatus and has for an object to provide such an apparatus that is easily portable and is particularly adapted for use on a table.

A further object of this invention is to provide a photographic projection apparatus made up of various parts easily adjustable relative to each other.

Another object of this invention is to provide a projection apparatus having an improved film holding device, which is susceptible of angular adjustment relative to the apparatus and hence to the screen that is being used.

A fourth object of this invention is to provide projection apparatus which need not have its own projection lens, but which is particularly adapted to use a separable camera lens, which lens may form part of portable camera apparatus more particularly disclosed and claimed in an application of even date herewith and filed on August 31, 1931, Serial No. 560,254.

With the above and other objects in view, the invention consists in the construction, combination and arrangement of parts as will be described more fully hereinafter.

Reference is to be had to the accompanying drawings forming a part of this specification, in which like reference characters indicate corresponding parts throughout the several views, and in which:

Fig. 1 is a vertical cross sectional view of the photographic apparatus constituting this invention;

Fig. 2 is a section on line 2—2 of Fig. 1;

Fig. 3 is a section of the film-holding unit on line 3—3 of Fig. 6;

Fig. 4 is a section just above the base on the line 4—4 of Fig. 1;

Fig. 5 is a section on line 5—5 of Fig. 1;

Fig. 6 is a detail of the film-holding unit with the camera lens removed.

There is shown at 11 the photographic projection apparatus comprising this invention that consists generally of the base 12, the casing 13, the lens 14, the film-holding unit support 15 and the film-holding unit 16, which is adapted to receive and support the camera lens unit 17. It will be noted that this camera lens unit 17 is the same camera lens unit shown and claimed in the copending application executed as of even date herewith for a portable photographic apparatus, filed on August 31, 1931, Serial No. 560,254.

The base 12 is supported on any suitable surface 18 by means of the legs 19, which are threaded as at 20 and are knurled as at 21, whereby each leg may be lengthened or shortened as desired to change the angular relation between the base 12 and the supporting surface 18. A light socket 22 is affixed to the base 12 by means of the screws 23, the base being formed as at 24 to permit ventilation of the bulb 25 which is to be secured in the socket 22, the socket having the two contacts 26 and 27 connected to wire 28. A flange 29 is secured across the front of the base 12 by any suitable means, and the two side edges and the rear edge of the base are turned upwardly to form a supporting flange 30 for the casing 13.

The casing 13 has a series of slots 31 adjacent its lower edges to receive the bolts 32 which are threaded to adjustably secure the casing to the base, the flange 30 thus telescoping with casing 13. After the proper adjustment has been made, it may be necessary to remove the casing from the base, as for replacing a bulb. When this is done, it is desirable that the casing be replaced in the same relative adjustment thereto. Accordingly, a means has been provided for limiting the telescopic movement of the casing and the flange comprising one or more washers 75 having one edge turned as at 76 and slotted as at 77. An opening is provided in the casing 13 to receive a bolt and nut 78, and the washer is placed within the casing 13 with the bolt passing through the casing 13 and the slot 77 in the washer 75 so that its edge 76 abuts against the top edge 79 of the flange 30.

The casing is substantially box-shaped as shown, and is perforated as at 33 to permit ventilation of the light bulb 25. Affixed to the inside of the casing is a box 34 having an opening 35 in the bottom thereof to allow it to pass over the bulb 25 and to allow air to pass upwardly therethrough when the casing is placed on the base. A false top 36 has a similar opening 37 therein, while the true top 38 is formed with louvers 39 therein. The box 35 thus serves to allow a circulation of air coming through the openings 24 and 35 to pass about the bulb 25 and escape through its top and then through the casing, but prevent any rays of light escaping through these ventilation openings, the box being preferably painted black for this purpose. This box also serves as a supporting medium for the concave reflecting lens 40. It is threaded therethrough as at 41, where a lock nut 42 is used to secure this lens 40 in any adjusted position, the casing 12 being cut away at 43 to permit access thereto.

A condensing lens 14 is secured to the front of the casing in alignment with the bulb filament and the reflecting lens. The condensing lens 14 comprises the two convex lenses 44 adjustably affixed in the lens barrel 45 and secured in adjustment by the set screw 47.

The film-holding unit support 15 comprises an internally threaded ferrule 48 secured to the casing 12 by the metal straps 49 and is in alignment with the lens 14. This ferrule is adapted to receive therein the nut 50 forming part of the film-holding unit 16.

The film-holding unit 16 comprises the main plate 51, the nut 50, the film roll-holding member 52 hinged to plate 51, the plate 53 secured to the main plate 51 and spaced therefrom by means of the strips 56 to allow the film to pass therebetween, and the film-feeding mechanism 54 shown in detail in Fig. 2. There is an opening in the nut 50, in the main plate 51 and in the plate 53 allowing the light from the lens 14 to pass therethrough. The smallest of these openings is the rectangular opening 55 in the main plate 51 which thus frames the light therethrough in a corresponding manner.

The film-feeding mechanism 54 comprises the spindle 57 journaled in the turned-over flanges 58 on main plate 51 and having the sprocket wheels 59 affixed thereto, the spindle being controlled by the knurled knob 60. The teeth 61 on the sprocket wheels 59 pass through slits 62 in plates 51 and 53 and into sprocket openings (not shown) in the film 80, thus controlling the feeding of the film therethrough, it being understood that the film preferably used is similar in that respect to conventional motion picture film.

A lever 63 having a cam surface 64 is pivoted to the main plate 51 as shown, and serves to lock the film-holding unit 16 in any angular position on the ferrule 48, whereby the image may be turned to appear at any desired angle.

Instead of providing a projection lens for this apparatus, use is made of a camera lens. In the form here shown, the camera lens of the above identified patent application may be used. This camera lens is shown generally at 17 and has at one side a flat plate 65 which, in the companion application, is disclosed as being part of the means whereby the camera is secured. Similar use of this plate 65 is made to secure the lens to this projection apparatus 11, the opening in plate 53 being shaped and sized to just receive the plate 65 therein. A pair of arms 66 are each pivoted to the plate 53 at one side of the opening therein, and are turned back as shown in Fig. 6 to allow the plate 65 to be placed in the opening in plate 53. The arms 66 are then turned forwardly until each one lies across one end of plate 65, and the ends 67 of the arms 65 lock behind the screw heads 68. In this way, the camera lens 17 is detachably, yet firmly, secured to the film-holding medium 16 and will be turned therewith when the film-holding unit is angularly rotated to reverse or change the angle at which the image is being projected. The lens mechanism 69 may be adjusted relative to the lens 44 by rotating its externally threaded barrel 70 within the internally threaded barrel 71 until it is in proper focus.

In operation, the bulb 25 is inserted in socket 22 before the casing 13 is adjustably secured to the base 12, the legs 19 being adjusted to place the apparatus either level or at a desired angle. The nut 50 of the film-holding unit 16 is threaded into the ferrule 48 and may be locked at any angular position by the lever 63. The roll of film is placed in the roll holder 52, which may be hinged backwardly to allow easier handling thereof, and the end of the roll is fed between the plates 51 and 53 until it reaches the sprocket wheels 59. It is then controlled by the knob 60. The camera lens 17 is borrowed from the camera apparatus and locked in place by the arms 66 and the various parts having been properly adjusted, the apparatus is now ready for exhibiting images on any appropriate screen. For table use, an appropriate screen is shown in the co-pending patent application executed as of even date herewith and filed on August 31, 1931, Serial No. 560,251, and which application, has matured into Patent No. 1,901,183, dated March 14, 1933. Due to the easy portability of these apparatuses, reproductions of rare books and manuscripts as well as many otherwise unavailable materials, often hidden away in libraries, as well as scenes of any sort, may be made easily available both for personal use or for lecture use before large or small groups.

It will be understood that the above description and accompanying drawings comprehend only the general and preferred embodiment of this invention, and that various changes in construction, proportion and arrangement of parts may be made within the scope of the appended claims, and without sacrificing any of the advantages of this invention.

The herein described invention may be manufactured and used by or for the Government of the United States of America for governmental purposes without the payment of any royalties thereon or therefor.

Having thus set forth and disclosed the nature of this invention, what is claimed is:

1. A photographic projection apparatus comprising an adjustable base, a casing adjustably mounted on said base, means for mounting an illumination means in said casing, an illumination means, an adjustable reflecting means mounted behind said illuminating means, a light condensing lens mounted in front of said illumination means, an internally threaded ferrule mounted in front of said light condensing lens, a film-holding medium detachably threaded into said ferrule, and means on said film-holding medium for securing a camera lens in position thereon.

2. A photographic projection apparatus comprising an adjustable base, a perforated casing adjustably mounted on said base, means for mounting an illumination means in said casing, an illumination means, an adjustable reflecting means mounted behind said illuminating means, a light condensing lens mounted in front of said illumination means, an internally threaded ferrule mounted in front of said light condensing lens, a film-holding medium detachably threaded into said ferrule, a film feeding means secured in said film-holding medium, and means on said film-holding medium for securing a camera lens in position thereon.

3. In a photographic projection apparatus, a base, a casing, a flange projecting upwardly from the base, said flange and said casing telescoping one within the other, means for securing said flange and said casing in a desired relative position, and means for adjustably limiting the relative telescopic relation between the flange and the casing, said means comprising a slotted washer and bolt means for securing said washer within said casing so that one edge of said washer may abut against the edge of said flange.

4. In a photographic projection apparatus, a casing having a source of illumination, an internally threaded ferrule mounted on said casing, and a film-holding medium, said film-holding medium comprising a plate having an opening therethrough to frame the image, a nut fixed to the back of said plate and adapted to be rotatably received in the ferrule, a cam pivoted to the back of the plate, means for spacing the frame member of the ferrule and hold the plate at any angular position, a frame member affixed to the front of the plate, means for spacing the frame member from the plate to allow the film to pass therebetween, a film-roll-holding member hinged to one end of the plate and a film-controlling sprocket affixed to the other end of the plate.

5. In a photographic projection apparatus, a casing having a source of illumination, an internally threaded ferrule mounted on said casing, and a film-holding medium, said film-holding medium comprising a plate having an opening therethrough to frame the image, a nut fixed to the back of said plate and adapted to be rotatably received in the ferrule, a cam pivoted to the back of the plate adapted to lock against the outside of the ferrule and hold the plate at any angular position, a frame member affixed to the front of the plate, means for spacing the frame member from the plate to allow the film to pass therebetween, a film-roll-holding member hinged to one end of the plate and a film-controlling sprocket affixed to the other end of the plate, said frame having an opening therethrough larger than the opening through the plate, said opening being adapted to receive a correspondingly shaped plate of a camera lens, and means on said plate to clamp the camera plate lens in position thereagainst.

BYRON McCANDLESS.